US011409503B2

(12) United States Patent
Okamura

(10) Patent No.: US 11,409,503 B2
(45) Date of Patent: Aug. 9, 2022

(54) CONTENT DEVELOPMENT DEVICE

(71) Applicant: NINTENDO CO., LTD., Kyoto (JP)

(72) Inventor: Yuichiro Okamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 16/221,726

(22) Filed: Dec. 17, 2018

(65) Prior Publication Data

US 2019/0212987 A1 Jul. 11, 2019

(30) Foreign Application Priority Data

Dec. 21, 2017 (JP) .............................. JP2017-245640

(51) Int. Cl.
*G06F 8/30* (2018.01)
*G06F 8/71* (2018.01)
*G06F 16/901* (2019.01)
*G06F 16/25* (2019.01)
*G06F 8/33* (2018.01)

(52) U.S. Cl.
CPC .............. *G06F 8/316* (2013.01); *G06F 8/33* (2013.01); *G06F 8/71* (2013.01); *G06F 16/252* (2019.01); *G06F 16/901* (2019.01); *G06F 16/902* (2019.01)

(58) Field of Classification Search
CPC .............. G06F 8/314–36; G06F 8/71; G06F 16/24–252; G06F 16/90–902; G06F 8/316; G06F 8/33–34; G06F 16/252; G06F 16/901–902

See application file for complete search history.

(56) References Cited

U.S. PATENT DOCUMENTS 5,675,802 A * 10/1997 Allen ....................... G06F 8/71
717/103
7,546,286 B2 * 6/2009 Dickinson ............... G06F 16/20
(Continued)

OTHER PUBLICATIONS

Fabian Winkler, "Introduction to Unity3D (vers.4.2)" published by AD41700 Computer Games, Retrieved online [https://web.ics.purdue.edu/~fwinkler/AD41700_F13/AD41700_Unity3D_workshop01_F13.pdf], pp. 1-13 (Year: 2013).*

(Continued)

*Primary Examiner* — S. Sough
*Assistant Examiner* — Zheng Wei
(74) *Attorney, Agent, or Firm* — Scully, Scott, Murphy & Presser, P.C.

(57) ABSTRACT

This content development apparatus includes at least one storage medium and at least one processor. The storage medium is configured to store a plurality of resource data pertaining to content being created; and store a database pertaining to the resource data. The processor is configured to execute a plurality of editing processes; generate first information created for each type of the resource data and at least including a location of each of the resource data, and second information expressing an association between different types of the first information; store the first and the second information in the at least one storage medium; respond to a request from one of the editing processes to acquire, using a designated resource data, information indicating a different type of the resource data associated with the designated resource data; notify the editing process; and update the database.

10 Claims, 10 Drawing Sheets

(56) References Cited

U.S. PATENT DOCUMENTS

| | | | | |
|---|---|---|---|---|
| 7,967,678 | B2* | 6/2011 | Dougherty | A63F 13/10 |
| | | | | 463/30 |
| 7,979,455 | B2* | 7/2011 | Krishnamoorthy | |
| | | | | G06F 16/24534 |
| | | | | 707/761 |
| 9,454,363 | B1* | 9/2016 | Angell | G06F 8/71 |
| 2004/0008727 | A1* | 1/2004 | See | H04L 41/024 |
| | | | | 370/469 |
| 2006/0218174 | A1* | 9/2006 | Cook, III | G06F 9/4493 |
| | | | | 707/999.102 |
| 2009/0210481 | A1* | 8/2009 | Fletcher | G06F 16/958 |
| | | | | 709/203 |
| 2010/0049694 | A1* | 2/2010 | Deffler | G06F 16/213 |
| | | | | 707/769 |
| 2014/0358974 | A1* | 12/2014 | Romani Also | G06F 16/901 |
| | | | | 707/805 |
| 2015/0154279 | A1* | 6/2015 | Kim | G06F 16/9024 |
| | | | | 707/738 |
| 2016/0098418 | A1* | 4/2016 | Dakshinamurthy | |
| | | | | G06F 16/2228 |
| | | | | 707/609 |
| 2018/0067976 | A1* | 3/2018 | Schoppe | G06F 16/252 |
| 2018/0121174 | A1* | 5/2018 | Phillips | G06Q 10/1091 |

OTHER PUBLICATIONS

Sue Blackman, "Beginning 3D Game Development with Unity 4: All-in-One, Multi-Platform Game Development" published by APress, pp. 1-796 (Year: 2013).*

* cited by examiner

Fig. 7

TABLE NAME: object

| Object_uri | age | sex | modelinfo_uri | ... |
|---|---|---|---|---|
| AAA | 1 | m | charaAAA | ... |
| BBB | 3 | f | charaBBB | ... |
| CCC | 5 | m | charaCCC | ... |
| ... | ... | ... | ... | ... |

Fig. 8

TABLE NAME: modelinfo

| modelinfo_uri | model_uri | color | ... |
|---|---|---|---|
| charaAAA | 0001.model | red | ... |
| charaBBB | 0002.model | green | ... |
| charaCCC | 0003.model | blue | ... |
| ... | ... | ... | ... |

Fig. 9

TABLE NAME: model

| model_uri | num-vertex | shader | ... |
|---|---|---|---|
| 0001.model | 1000 | Flat | ... |
| 0002.model | 2000 | Glow | ... |
| 0003.model | 1509 | Flat | ... |
| ... | ... | ... | ... |

Fig. 10

TABLE NAME: con_object_to_modelinfo

| object_uri | modelinfo_uri |
|---|---|
| AAA | charaAAA |
| BBB | charaBBB |
| CCC | charaCCC |
| ... | ... |

Fig. 11

TABLE NAME: con_modelinfo_to_model

| modelinfo_uri | model_uri |
|---|---|
| charaAAA | 0001.model |
| charaBBB | 0002.model |
| charaCCC | 0003.model |
| ... | ... |

CONTENT DEVELOPMENT DEVICE

CROSS REFERENCE TO RELATED APPLICATION

This application claims priority from Japanese Patent Application No. 2017-245640 filed on Dec. 21, 2017, the content of which is incorporated herein by reference in its entirety.

TECHNICAL FIELD

The present invention relates to a content development device, a content development system, a development assistance method, and a storage medium.

BACKGROUND ART

When developing a game, a large amount of game data needs to be created. To that end, game development tools, such as one called Unity and described in unity3d.com, are used.

SUMMARY OF THE INVENTION

Game data is constituted of various kinds of data, such as model data that indicates the shape or the like of objects appearing in a game, and animation data that makes the objects operate in an animation, for example. However, the game data may have different structures depending on the game. If games to be developed are different, desired game data cannot be readily acquired with a game data editing tool (editing application). This kind of problem may occur not only in game development, but may also occur in the case of creating content such as video content pertaining to computer graphics, for example. That is, if different kinds of content are to be created, it is not easy to acquire the desired information for editing from resource data for the content.

The present disclosure has been made to solve this problem, and aims to provide a content development device, a content development system, a development assistance method, and a development assistance program that make it possible to readily acquire desired information from resource data even if the content to be created differs.

A content development apparatus according to the present disclosure comprising: at least one storage medium configured to: store a plurality of resource data pertaining to content being created; and store a database pertaining to the resource data; and at least one processor configured to: execute a plurality of editing processes each being capable of editing a corresponding type of the resource data; generate, based on the plurality of the resource data, first information created for each type of the resource data and at least including a location of each of the resource data, and second information expressing an association between different types of the first information; store the first information and the second information in the at least one storage medium as the database; respond to a request from one of the editing processes to acquire, using a designated resource data, information indicating a different type of the resource data associated with the designated resource data, based on at least one of the first information and the second information included in the database; notify the editing process that made the request, of the acquired information; and update the database if at least a portion of the resource data stored in the at least one storage media has been updated.

A content development system according to the present disclosure comprising: a first server; a second server; and at least one content development apparatus, wherein the at least one content development apparatus comprises: at least one first memory; at least one first processor; wherein the at least one first memory comprises: a first resource data storage storing a plurality of first resource data pertaining to content being created; a first database storage storing a first database pertaining to the first resource data; wherein the at least one first processor is configured to: download a plurality of resource data from the first server and store the plurality of the first resource data which is stored in the first resource data storage; execute a plurality of editing processes each being capable of editing a corresponding type of the first resource data; generate, based on the plurality of the first resource data, first information created for each type of the first resource data and at least including a location of each of the first resource data, and second information expressing an association between different types of the first information, and stores the first information and the second information in the first database storage as the first database; respond to a request from one of the editing processes to acquire, using a designated first resource data, information indicating a different type of the first resource data associated with the designated first resource data, based on at least one of the first information and the second information included in the first database, and notify the editing process that made the request, of the acquired information; and update the first database if at least a portion of the first resource data stored in the first resource data storage has been updated, and the second server comprises: at least one second processor; at least one second memory comprising: a second resource data storage that stores a plurality of second resource data downloaded from the first server; a second database storage that stores a second database pertaining to the plurality of second resource data; wherein the at least one second processor is configured to: generate, based on the plurality of the second resource data stored in the second resource data storage, first information created for each type of the second resource data and at least including a location of each of the second resource data, and second information expressing an association between different types of the first information, and stores the first information and the second information in the second database storage as the second database; and transmit the first information and the second information contained in the second database to each of the at least one content development apparatus, wherein each of the at least one content development apparatus updates the respective first database.

A non-transitory storage medium according to the present disclosure storing therein a development assistance program that is readable by a computer, the computer storing a plurality of resource data pertaining to content being created and being capable of performing one of plurality of editing processes that edits the resource data, the development assistance program causing the computer to execute: storing, in a database, first information created for each type of the resource data based on the plurality of the resource data and at least including a location of each of the resource data, and second information expressing an association between different types of the first information; responding to a request from one of the plurality of the editing processes to acquire, using a designated resource data, file information indicating a different type of the resource data associated with the designated resource data based on the database, notifying the editing process that made the request of the acquired file information; and updating the database if at least one of the plurality of resource data has been updated.

A development assistance method according to the present disclosure to be carried out in a content development apparatus in which a plurality of resource data pertaining to content being created are stored, the content development apparatus being capable of performing at least one editing process that edits the resource data, the method comprising: causing the content development apparatus to store, in a database, first information created for each type of the resource data based on the plurality of the resource data and at least including a location of each of the resource data, and second information expressing an association between different types of the first information; responding to a request from one of the at least one editing process to acquire, using a designated resource data, file information indicating a different type of the resource data associated with the designated resource data based on the database, notifying the editing process that made the request of the acquired file information; and updating the database if at least one of the plurality of the resource data has been updated.

BRIEF DESCRIPTION OF THE DRAWINGS

FIG. 7 shows an example of an object data table.

FIG. 8 shows an example of a model setting data table.

FIG. 9 shows an example of a model data table.

FIG. 10 shows a connection table indicating an association between the object data table and the model setting data table.

FIG. 11 shows a connection table indicating an association between the model setting data table and the model data table.

EMBODIMENTS OF THE INVENTION

Figure 1:
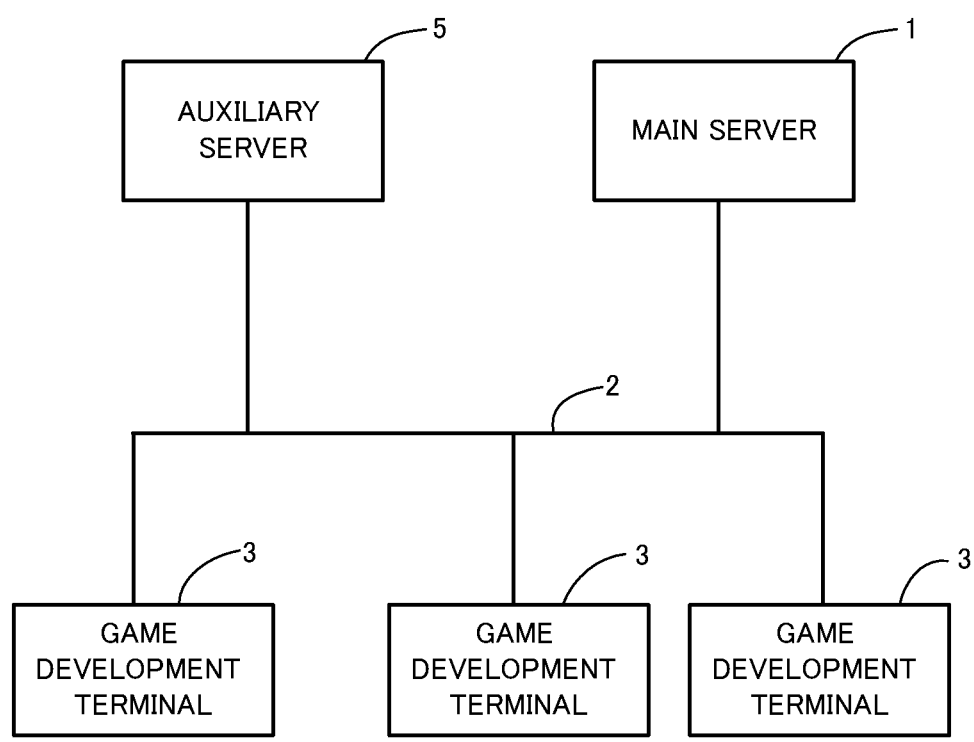
FIG. 1 is a schematic configuration diagram showing a game development system to which a development environment assistance system according to the present invention is applied.

An embodiment in the case of applying the content development system according to the present invention to a game development system will be described hereinafter with reference to the drawings. FIG. 1 is a schematic configuration diagram of the game development system.

1. Game Development System

As illustrated in FIG. 1, the game development system according to the present embodiment includes a main server 1 storing various types of data such as game programs, and a plurality of game development terminals 3 capable of communicating with the server 1 over a network 2. An auxiliary server 5, into which various types of data in the main server 1 are copied, is also connected to the network 2, and can communicate with the game development terminal 3. Aside from the Internet, the network 2 may be an intranet at a development business, or a private network for communicating with an external associated company, for example. In the system, a game developer develops a game using the game development terminal 3. At this time, the necessary game data and the like is downloaded from the main server 1, and various development tasks such as editing the game data are carried out. Once the development tasks are complete, the game data is sent to the main server 1 so as to update the game data. Furthermore, the game data is at least partially provided from the auxiliary server 5 as well, as will be described later. The main server 1, the auxiliary server 5, and the game development terminal 3 will be described in detail below.

2. Main Server

Figure 2:
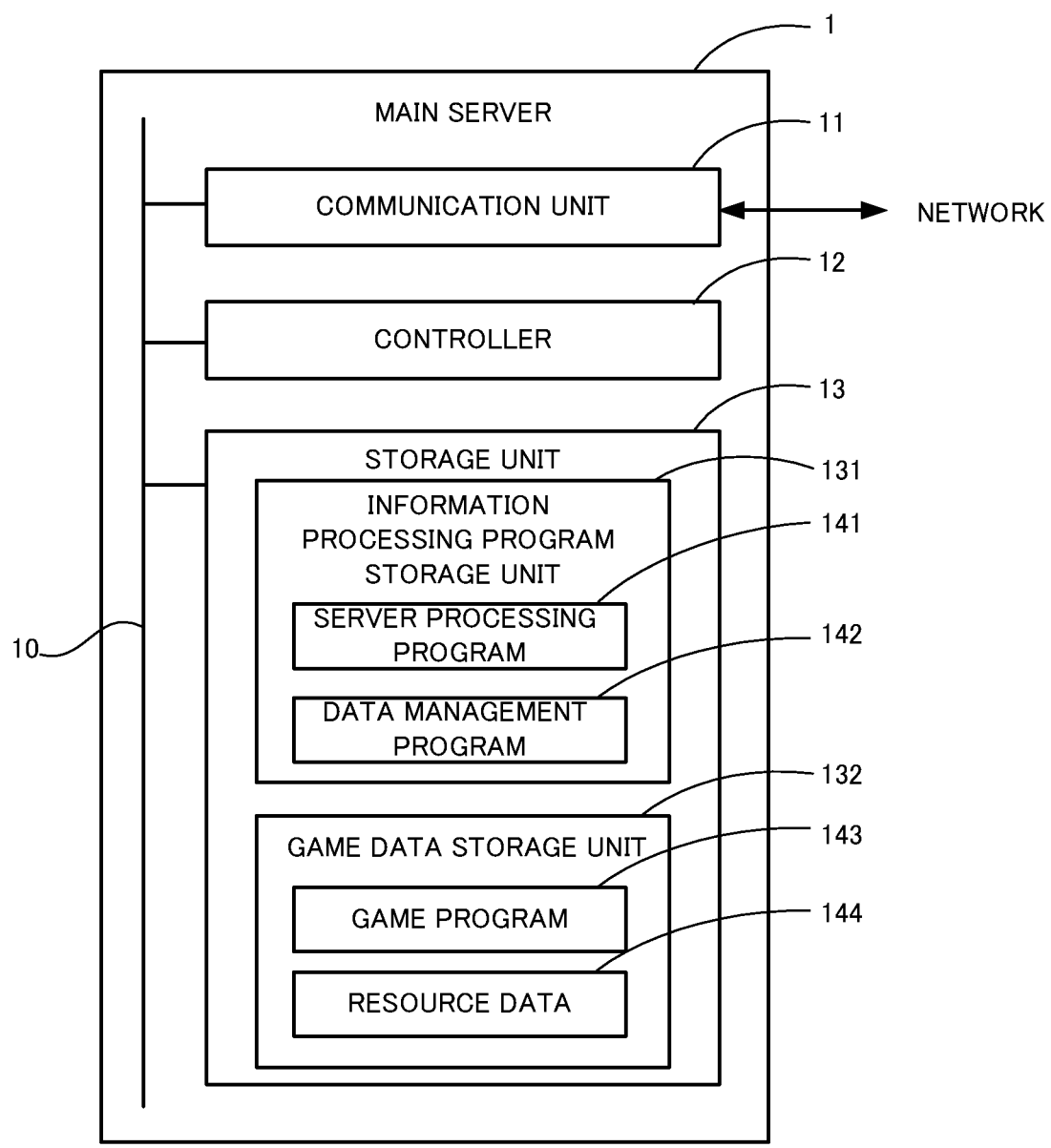
FIG. 2 is a block diagram showing an example of a configuration of a main server in the game development system in FIG. 1.

First, the main server 1 will be described with reference to FIG. 2. FIG. 2 is a block diagram illustrating an example of the configuration of the main server 1 according to the present embodiment.

As illustrated in FIG. 2, the main server 1 includes a communication unit 11, a controller 12, and a storage unit 13 connected to each other by a bus 10. The communication unit 11 is constituted of a predetermined communication module, and exchanges data with the game development terminal 3 over the network 2.

The controller 12 is constituted primarily of a CPU, RAM, ROM, and so on. Various types of information processing is carried out by the controller 12 executing programs stored in the storage unit 13. Exchanging data with the game development terminals 3, editing game data, including updating the game data, and so on can be given as examples of the information processing carried out by the controller 12. However, the information processing is not limited thereto, and also includes general information processing carried out for operating as a server.

The storage unit 13 can be constituted of a known storage device such as an HDD or an SSD, and includes an information processing program storage unit 131 storing programs and the like pertaining to the operation of the main server 1, and a game data storage unit 132 storing a game program 143 and the like.

The information processing program storage unit 131 includes a server processing program 141 for operating the main server 1, and a data management program 142 for managing resource data 144, which will be described later. The game data storage unit 132 contains a game program 143 under development, and the resource data 144 used for that game. The resource data 144 includes game data and metadata of the game data. In addition to game data directly used in the game, the game data also includes data for creating the game data. The metadata includes data connections, progress IDs, and so on. The resource data 144 may refer to one or more files, or may refer to a specific portion (data) that can be designated in a file.

The main server 1 can also include input units such as a keyboard, a mouse, and a touch panel as interfaces for a server administrator to make inputs, a display, an output unit such as a printer, and so on.

A predetermined login process can also be carried out when exchanging data with the main server 1 over the network 2. In this case, an authentication process that determines whether or not a user attempting to log into the main server 1 is a registered user may be carried out, or an authentication process that determines whether or not the game development terminal 3 attempting to connect to the main server 1 is registered may be carried out.

The main server 1 can be constituted of a single device, or can be constituted of a plurality of devices, while configuring each of the aforementioned units with separate devices as appropriate.

3. Game Development Terminal

Figure 3:
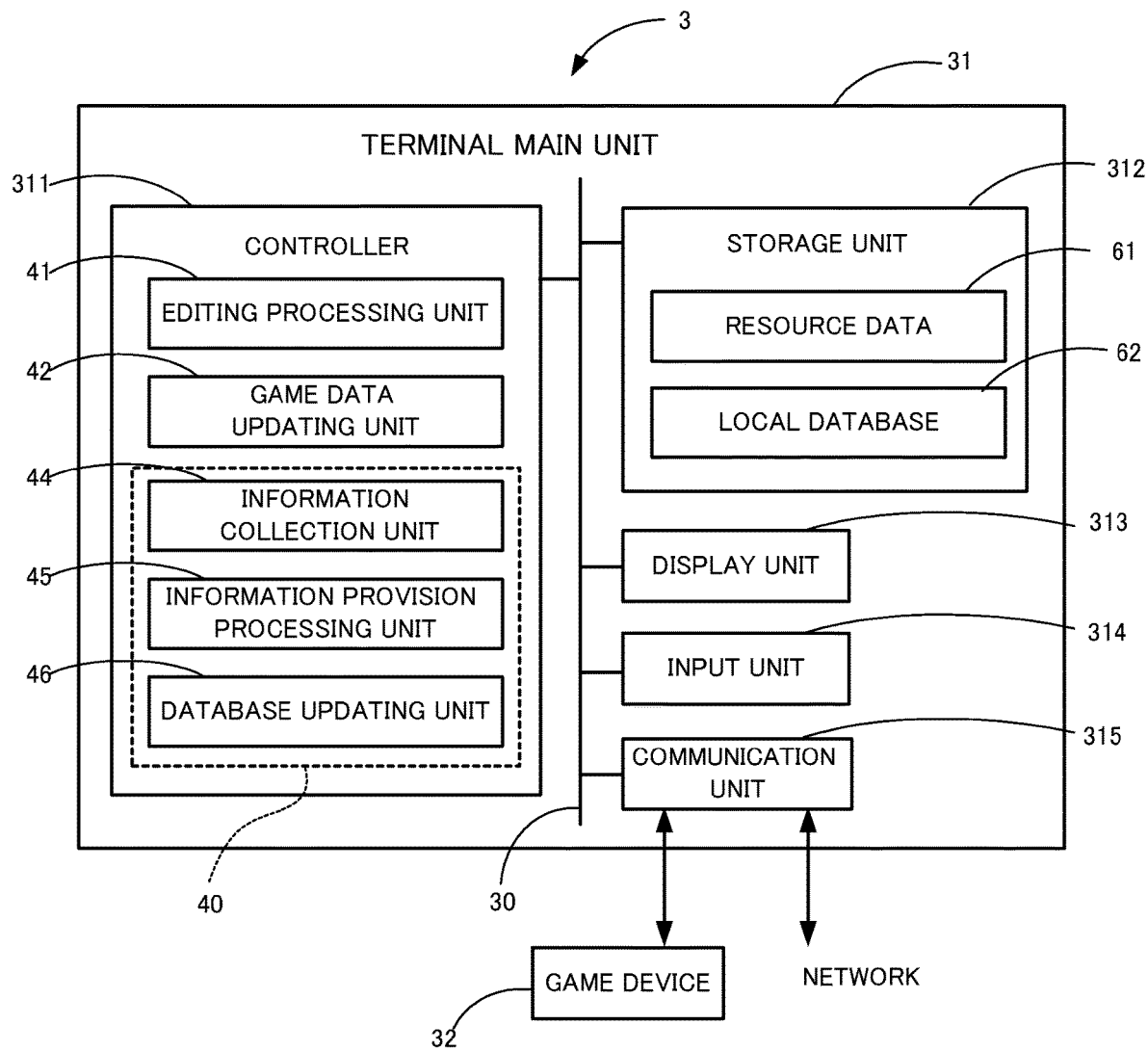
FIG. 3 is a block diagram showing an example of a configuration of a game development terminal in the game development system in FIG. 1.

Next, the game development terminal will be described with reference to FIG. 3. FIG. 3 is a block diagram illustrating an example of the configuration of the game development terminal according to the present embodiment.

As illustrated in FIG. 3, the game development terminal 3 includes a terminal main unit 31, and a game device 32 that is connected to the terminal main unit 31 and that executes the game being developed.

The terminal main unit 31 will be described first. As illustrated in FIG. 3, the terminal main unit 31 can be constituted by a known personal computer, for example. The terminal main unit 31 includes a controller 311, a storage unit 312, a display unit 313, an input unit 314, and a communication unit 315, which are connected to each other by a bus 30.

The controller 311 is constituted primarily of at least one CPU, RAM, ROM, and so on. The storage unit 312 can be constituted of a known storage device such as an HDD, an SSD, or the like, and stores various types of data used by the controller 311 to carry out the above-described game development. For example, various types of data (not shown in FIG. 3) downloaded from the above-described main server 1, such as the data management program 142, the game program 143, and the resource data 144, are stored in the storage unit 312. In particular, the storage unit 312 according to the present embodiment includes a plurality of instances of resource data 61, and a local database 62, which is constructed based on the resource data 61. The resource data 61 stored in the game development terminal 3 may be the same as the resource data 144 stored in the main server 1, or may be a portion of the resource data 144 depending on the content of work performed by a developer. The local database 62 will be described later. In the storage unit 312, the area storing the resource data 61 is an example of a resource data storage unit according to the present invention, and the area storing the local database 62 is an example of a database storage unit according to the present invention.

By executing the data management program 142 stored in the storage unit 312, the controller 311 functions virtually as an editing processing unit 41, a game data updating unit 42, an information collecting unit 44, an information provision processing unit 45, and a database updating unit 46. These functional elements (modules) will be described later.

The display unit 313 is constituted by a display device such as an LCD, and displays images in accordance with instructions from the controller 311. In the case where the terminal main unit 31 is constituted by a personal computer, for example, the display unit 313 may be a unit that is separate from the terminal main unit 31.

The input unit 314 may be any input device that can be operated by an operator such as a game developer, and can be constituted by a keyboard, a mouse, a touch panel, or the like. In the present embodiment, it is assumed that, for example, an operation for pressing a button or the like displayed in the display unit 313 is carried out using a mouse.

The communication unit 315 is constituted of a predetermined communication module, and exchanges data with the main server 1 and the auxiliary server 5 over the network 2.

The game device 32 is a dedicated game device that executes the game being developed, and is a stationary or mobile game device. In the case of a stationary game device, a display device such as an LCD is provided separately. Meanwhile, in the case of a mobile game device, a display unit is integrated into the game device. However, no particular distinction is made between the two in the present embodiment, and a device that displays game images in the game device 32 is simply referred to as a "display unit". Furthermore, the game device 32 is provided with an input unit for making operations pertaining to the game. Note that the game device 32 may be provided as a unit separate from the terminal main unit 31, or may be included in the terminal main unit 31.

4. Auxiliary Server

Figure 4:
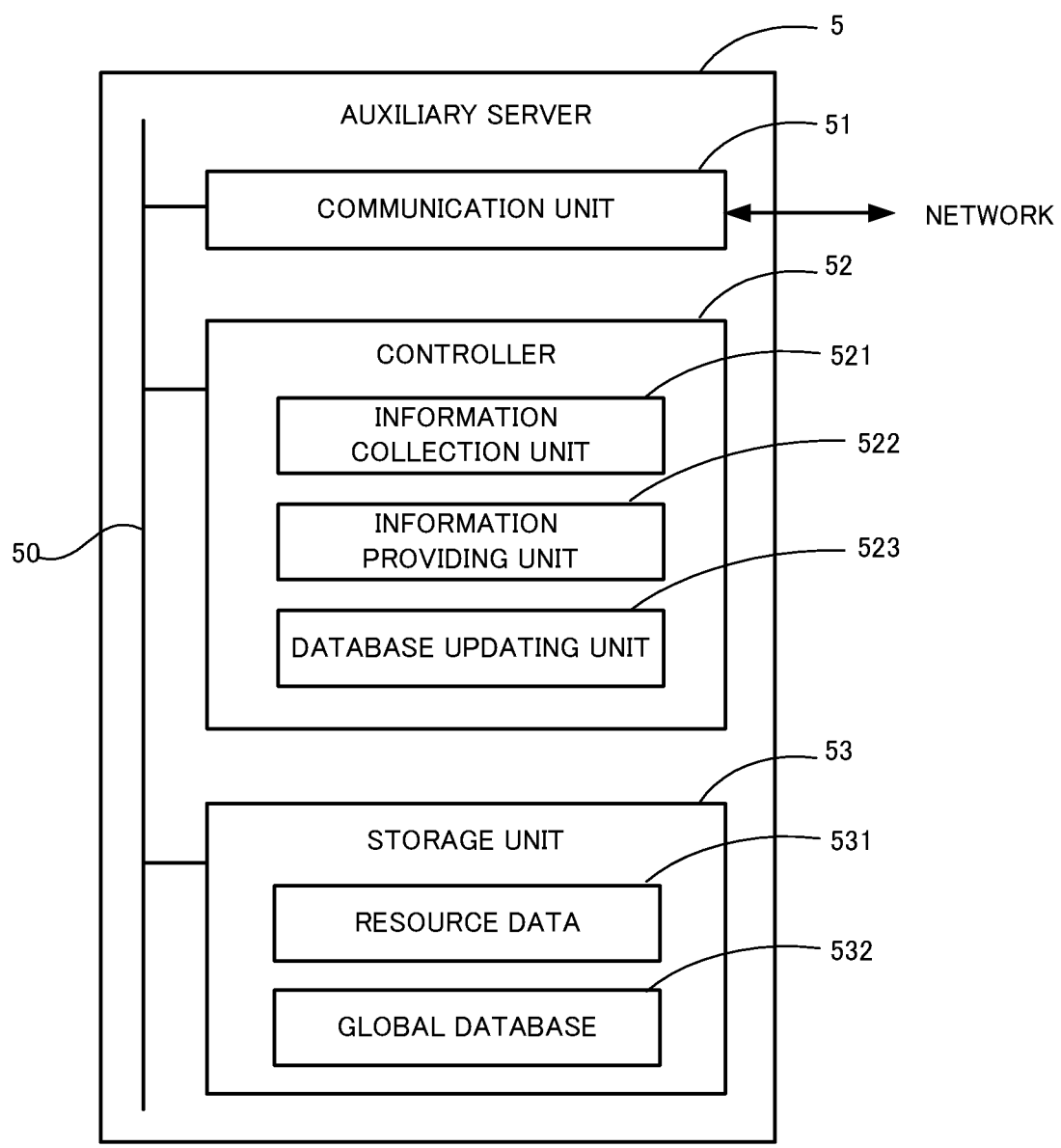
FIG. 4 is a block diagram showing an example of a configuration of an auxiliary server in the game development system in FIG. 1.

Next, the auxiliary server 5 will be described with reference to FIG. 4. As illustrated in FIG. 4, the auxiliary server 5 includes a communication unit 51, a controller 52, and a storage unit 53 connected to each other by a bus 50. The communication unit 51 is constituted of a predetermined communication module, and exchanges data with the main server 1 and the game development terminals 3 over the network 2.

The controller 52 is constituted primarily of at least one CPU, RAM, ROM, and so on. The storage unit 53 can be constituted by a known storage device such as an HDD or an SSD, and stores various types of data such as the data management program 142 and the resource data 144, which are downloaded from the main server 1. Resource data 531 to be stored in the storage unit 53 may be the same as the resource data 144 stored in the main server 1, or may be a portion thereof. The storage unit 53 also stores a global database 532, which plays a role similar to that of the local database 62 in the game development terminal 3. The global database 532 will be described later.

By executing the data management program 142 stored in the storage unit 53, the controller 52 virtually functions as an information collection unit 521, an information providing unit 522, and a database updating unit 523. Although these functional configurations (modules) will be described later, the information collection unit 521 and the database updating unit 523 are substantially the same as the information collection unit 44 and the database updating unit 46 in the game development terminal 3. The information providing unit 522 is for providing information generated by the information collection unit 521 to the local database 62 in each game development terminal 3. This point will also be described later.

In addition, the auxiliary server 5 can also include input units such as a keyboard, a mouse, and a touch panel as interfaces for a server administrator to make inputs, a display, an output unit such as a printer, and so on.

The auxiliary server 5 can be constituted of a single device, or can be constituted of a plurality of devices, while configuring the aforementioned units with separate devices as appropriate. For example, only the global database 532 can be constituted of another device.

5. Local Database Construction in Game Development Terminal

Next, a description will be given of construction of the local database 62, which is preparation processing to be performed before game development processing in the game development terminal 3 is performed. As will be described later, the game data is edited by the editing processing unit 41. The editing processing unit 41 is an application for editing the game data. A plurality of editing processing units, such as a map editing tool, an animation editing tool, and a development tool, for example, are provided for each instance of game data to be edited. A known image editing application or the like can also be used as the editing processing unit 41. The editing processing unit 41 has a function of reading out a necessary file from the resource data 61 and editing this file. The structure of the resource data 61 may differ depending on the game. If the game to be developed changes, there are cases where the necessary resource data 61 cannot be readily accessed from the editing processing unit 41. In the present embodiment, the local database 62 is constructed so that the necessary resource data 61 can be readily accessed regardless of the type of game. The construction of the local database 62 will be described below.

5-1. Summary of Game Data

The game data will be described first. The game data includes data for configuring objects that appear in the game, for example. "Objects" refer to various elements constituting the game. These elements include, for example, characters appearing in the game that include people, animals, monsters, and so on; items, weapons, and so on to be carried by the characters; structures such as buildings; natural features such as mountains, lakes, and rocks; and the like. In addition to objects having specific shapes, events occurring in the game (for example, battle scenes, riots, and so on) also serve as game data.

Game data, which includes "model", "animation", "physics", and so on, is associated with each object. "Model" is data expressing the shape and so on of the object, whereas "animation" is data for animating the object expressed by the model. "Physics" is data primarily indicating the physical properties of the object, and expresses weight, velocity, and so on, for example. However, the game data is not limited thereto, and can be set as appropriate in accordance with the object. Thus, each object is configured by associating the object with game data such as the aforementioned "model", "animation", "physics", and so on.

One object can be associated with a plurality of models or the like, and some models may be used not only for one object but also for other types of objects. This point also applies to the game data pertaining to "animation" and "physics". Thus, game data such as objects, "model", "animation", and "physics" is associated with each other, thereby constituting the respective objects.

The above-described game data is stored as the resource data 61 in the storage unit 312. Accordingly, the resource data 61 is created for each type of game data such as objects, "model", "animation", "physics", and so on. For example, the resource data pertaining to an object includes data such as the name, gender, and age of the object.

Figure 5A:
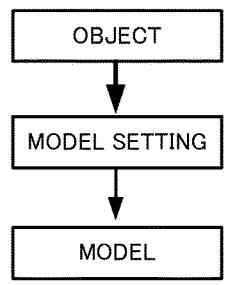
FIGS. 5A to 5C illustrate an association between an object and a model.
Figure 5B:
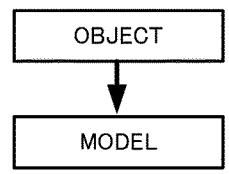
Figure 5C:
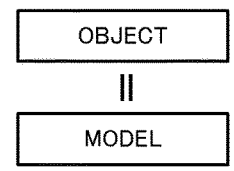

These instances of the resource data 61 are associated with each other in various ways. For example, there are three types of association between the instances of the resource data pertaining to objects and models, as illustrated in FIGS. 5A to 5C. In the example illustrated in FIG. 5A, the resource data pertaining to the object (hereinafter referred to as an object data file) is associated with the resource data pertaining to the model setting (hereinafter referred to as a model setting file), and the model setting file is further associated with the resource data pertaining to the model (hereinafter referred to as a model data file). Accordingly, to know which model data file is used for an object, it is necessary to search for the model setting file that is associated with the object data file, and then search for the model data file based on that model setting file. Although the resource data is in a file format in this example, the resource data may be data that constitutes a portion of a file, as mentioned above.

In the example illustrated in FIG. 5B, the object data file is directly associated with the model data file. Accordingly, in this example, the object data file enables the model data associated therewith to be found. In the example illustrated in FIG. 5C, the name of the object serves as the name of the model.

Thus, the association method for the resource data 61 may differ depending on the game. In the present embodiment, tables of collected necessary data are generated for each type of resource data 61 by the aforementioned information collection unit 44. That is, to enhance versatility in game development, tables for organizing the resource data 61 are generated. This point will be described below in detail.

5-2. Functions of Information Collection Unit

Figure 6:
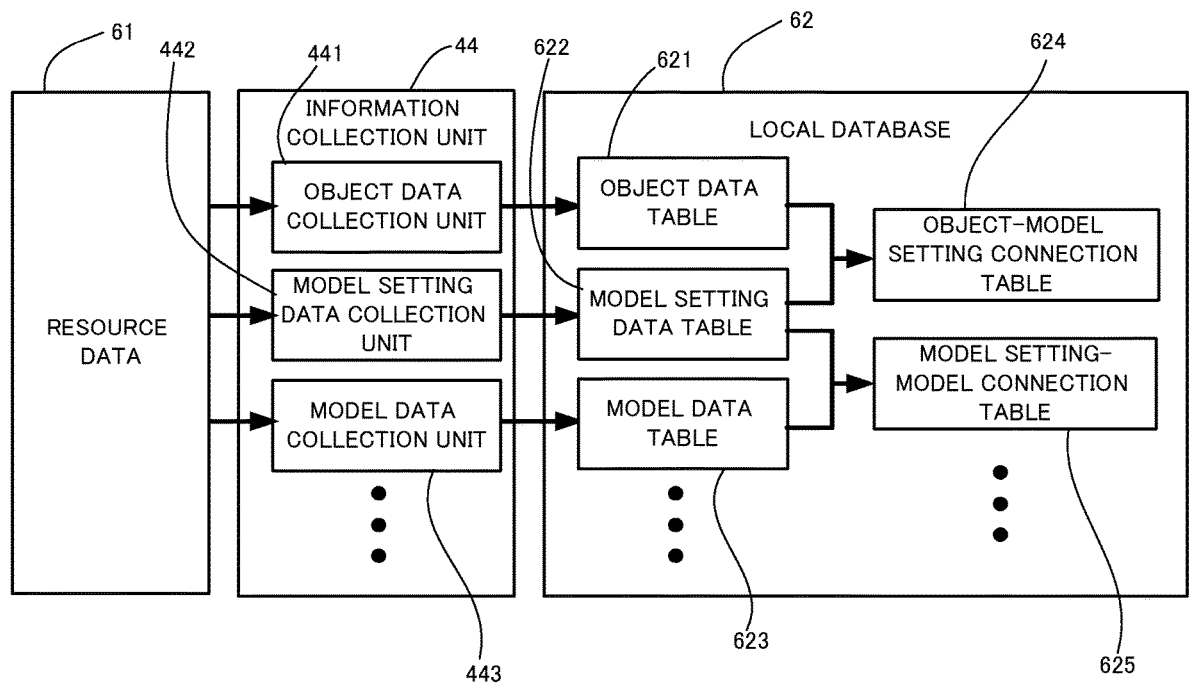
FIG. 6 is a block diagram illustrating construction of a local database in the game development terminal.

As illustrated in FIG. 6, the information collection unit 44 includes a plurality of information collection units for respective types of resource data 61. In FIG. 6, an object data collection unit 441, a model setting data collection unit 442, and a model data collection unit 443 are provided as exemplary units included in the information collection unit 44. That is, the controller 311 functions as the object data collection unit 441, the model setting data collection unit 442, and the model data collection unit 443. For example, the object data collection unit 441 collects the game data from the resource data 61 pertaining to the object, and generates an object data table 621. Similarly, the model setting data collection unit 442 collects the game data from the resource data 61 pertaining to the model setting data, and generates a model setting data table 622. The model data collection unit 443 collects the game data from the resource data 61 pertaining to the model data, and generates a model data table 623. Note that these tables can be constituted of one or more files.

FIG. 7 shows an example of the object data table 621. The table in FIG. 7 is generated by extracting the game data from all instances of the resource data 61 pertaining to the object, and the table name is "object". That is, data pertaining to an object is contained in each row of the table. For example, the first row of the table contains data pertaining to an object named "AAA", and indicates that the name (which is also a URI) of the object is AAA, the age is one, the gender is male, and the URI of the model setting data pertaining to AAA is charaAAA.

FIG. 8 shows an example of the model setting data table 622. The table in FIG. 8 is generated by extracting the game data from all instances of the resource data pertaining to the model setting, and the table name is "modelinfo". That is, data pertaining to a model setting is contained in each row of the table. For example, the first row of the table contains model setting data with a URI "charaAAA", and indicates that the URI of the model designated by this model setting data is 0001.model, and the color is red.

FIG. 9 shows an example of the model data table 623. The table in FIG. 9 is generated by extracting the game data from all instances of the resource data 61 pertaining to the model, and the table name is "model". That is, data pertaining to a model is contained in each row of the table. For example, the first row of the table contains the model with a URI "0001.model", and indicates parameters ("num-vertex" and "shader" as examples) to be used for this model.

Thus, the information collection unit 44 extracts data from the resource data 61 on the basis of types, and generates tables. That is, it can be said that the tables generated here are lists of the game data generated on the basis of the types of resource data 61, for example. Note that the information collection unit 44 does not need to collect all instances of the resource data 61, and can collect only the necessary data. That is, at least the locations of the resource data 61 (URIs or paths etc.) need only be collected. The above-described tables 621 to 623 will be referred to as source tables, and these source tables are examples of first information in the present invention.

Furthermore, the information collection unit 44 generates connection tables that indicate the association between the source tables, based on the generated source tables. For example, FIG. 10 shows a connection table indicating the association between the object data table and the model setting data table. This connection table is an example of second information in the present invention. The table name of this connection table is "con_object_to_modelinfo", which contains a character string "con" indicating a connection table. This connection table includes the names (URIs) of objects included in the object data table, and URIs of the model setting data included in the model setting data table. FIG. 11 shows a connection table indicating the association between the model setting data table and the model data table. The table name of this connection table is "con_modelinfo_to_model". This connection table includes URIs of the model setting data included in the model setting data table, and URIs of the models included in the model data table. Source tables associated in these connection tables can be understood from the table names thereof. That is, as for the connection table with the table name "con_object_to_modelinfo", the character string "object_to_modelinfo" included therein indicates that the object data table ("object") and the model setting data table ("modelinfo") are associated with each other. Similarly, as for the connection table with the file name "con_modelinfo_to_model", the character string "modelinfo_to_model" included therein indicates that the model setting data table ("modelinfo") and the model data table ("model") are associated with each other.

For example, in the case of using the source table shown in FIG. 5B, the connection table associates the object data table with the model data table, and has a file name "con_object_to_model". This connection table includes the name (URI) of each object and a URI of the model. A connection table in the case of the example in FIG. 5C can also be generated similarly to the example in FIG. 5B.

The information collection unit 44 is regularly launched, and generates the above-described source tables 621 to 623 and the connection tables 624 and 625. For example, the information collection unit 44 can be configured to be launched when the game development terminal 3 is launched, or to be launched every predetermined time. The source tables 621 to 623 and the connection tables 624 and 625 may be newly created every time the information collection unit 44 is launched, or may be updated so as to reflect only an updated portion of the resource data 61. The above-described format of various tables is an example, and the data to be included, column names (object_uri etc.), and so on can be changed as appropriate.

5-3. Functions of Information Provision Processing Unit

Next, functions of the information provision processing unit 45 will be described. The information provision processing unit 45 provides necessary data based on the source tables 621 to 623 and the connection tables 624 and 625 that are generated as described above. Here, a method of providing data based on the connection tables 624 and 625 will be described. For example, to check a list of models used for an object, a search is started with the table with a table name including the character string "object", which indicates the object data table. This table will be hereinafter called a start table. In this case, as mentioned above, the table with the file name "con_object_to_modelinfo" is the start table. Also, the table with a table name including the character string "model", which indicates the model data table, is a target of the search. This table will be hereinafter called a target table. In this case, as mentioned above, the table with the table name "con_modelinfo_to_model" is the target table. Since the table names of both the start table and the target table include the character string "modelinfo", "con_object_to_modelinfo" can be associated with "con_modelinfo_to_model", and the model used for the object can be checked based on the object by referencing these tables. That is, as illustrated in FIGS. 10 and 11, it can be understood that, for example, the object "AAA" uses the model "0001.model", by referencing these connection tables. In the above example, by associating two connection tables that are the start table and the target table, the models used for an object can be found based on this object. However, there are also cases where the start table is associated with the target table via a plurality of connection tables.

As a result of the above-described tables being stored in the local database 62, if, for example, a request is made from the editing processing unit 41 to the local database 62, the information provision processing unit 45 can search the local database 62 and provide data corresponding to the request, based on this request. For example, in the above example, if an object name is input to the editing processing unit 41, the local database 62 is searched by the information provision processing unit 45, and then a model used for this object can be output and provided to the editing processing unit 41. In other cases, if an object name is input, "animation", "physics", and the like used for this object can also be output.

5-4. Functions of Database Updating Unit

If a portion of the resource data 61 is updated, the database updating unit 46 detects this update, and launches an information collection unit 44 corresponding to the updated portion of the resource data 61. Thus, the launched information collection unit 44 updates a portion of the source tables 621 to 623 and the connection tables 624 and 625 corresponding to the updated portion of the resource data 61. The updating of the resource data 61 will be described later. The database updating unit 46 can be realized by using a function included in an OS installed in the game development terminal 3, or may be realized by another application.

5-5. Others

In the above example, information requested by the editing processing unit 41 is acquired from the local database 62. However, data can also be directly acquired from the resource data 61, depending on the specifications of the editing processing unit 41. For example, an animation editing tool (e.g. an application for editing animations), which is an editing processing unit 41 for editing animations, can directly acquire the resource data 61 pertaining to animations, without using the local database 62. Accordingly, for example, it is difficult to directly acquire the resource data 61 other than that pertaining to animations due to the specifications of the editing processing units 41. Thus, in the case of referencing, for example, resource data other than that pertaining to animation while the animation editing tools are operating, resource data other than that pertaining to animation can be acquired from the local database 62, and can then be subjected to processing such as browsing and editing on the animation editing tool.

6. Construction of Global Database in Auxiliary Server

Figure 12:
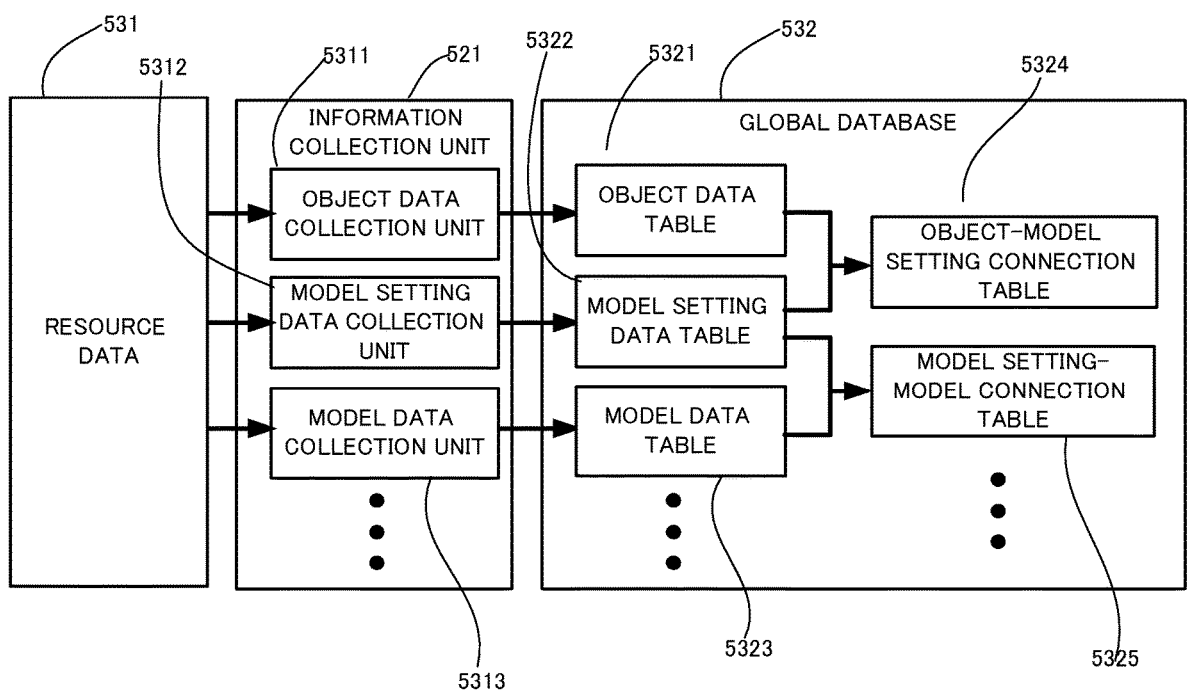
FIG. 12 is a block diagram illustrating construction of a global database in the auxiliary server.

Construction of the global database 532 in the auxiliary server 5 will be described next. Initially, the global database 532 is constructed in a manner substantially similar to the above-described local database 62. That is, as illustrated in FIG. 12, various source tables 5321 to 5323 and connection tables 5324 and 5325 are generated based on the resource data 531 by the information collection unit 521. However, the resource data 531 stored in the auxiliary server 5 differs from the resource data 61 in the game development terminals 3. That is, the resource data 61 in the game development terminals 3 is edited by developers day by day, and accordingly differs between game development terminals 3. In addition, the game development terminals 3 do not always download all resource data 144 from the main server 1, and there are also cases where a developer downloads only a portion of the resource data 144, considering the necessity of work or the capacity of the game development terminal 3. Accordingly, the local database 62 constructed in the game development terminals 3 may not be generated reflecting all of the resource data 144 that exists in the main server 1.

Meanwhile, the resource data 531 in the auxiliary server 5 is not directly edited by developers, and is primarily constructed by downloading all of the latest resource data 144 in the main server 1. Accordingly, the source tables 5321 to 5323 and connection tables 5324 and 5325 generated based on the resource data 531 primarily reflect all of the latest resource data 144 in the main server 1. The information providing unit 522 in the auxiliary server 5 plays a role of copying the generated source tables 5321 to 5323 and connection tables 5324 and 5325 to the local database 62 in each game development terminal 3. Thus, the local database 62 includes the same tables as those in the global database 532 as initial values. As an example of a management method, for example, the tables can be sent from the global database 532 and copied to the local database 62 when the game development terminal 3 is launched for the first time every day.

The database updating unit 523 in the auxiliary server 5 plays a role of updating the resource data 531 in the auxiliary server 5 upon detecting a change in the resource data 144 in the main server 1, so as to reflect this change. At this time, the main server 1 itself may send updated content to the database updating unit 523 in the auxiliary server 5 upon detecting a change in the resource data 144. Alternatively, the database updating unit 523 may monitor the resource data 144 in the main server 1 every predetermined time to detect a change. If the resource data 531 in the auxiliary server 5 is updated, the information collection unit 521 creates a new table or updates existing tables every time the resource data 531 is updated, or every predetermined time. The global database 532 is thus updated.

7. Updating of Local Database

Figure 13:
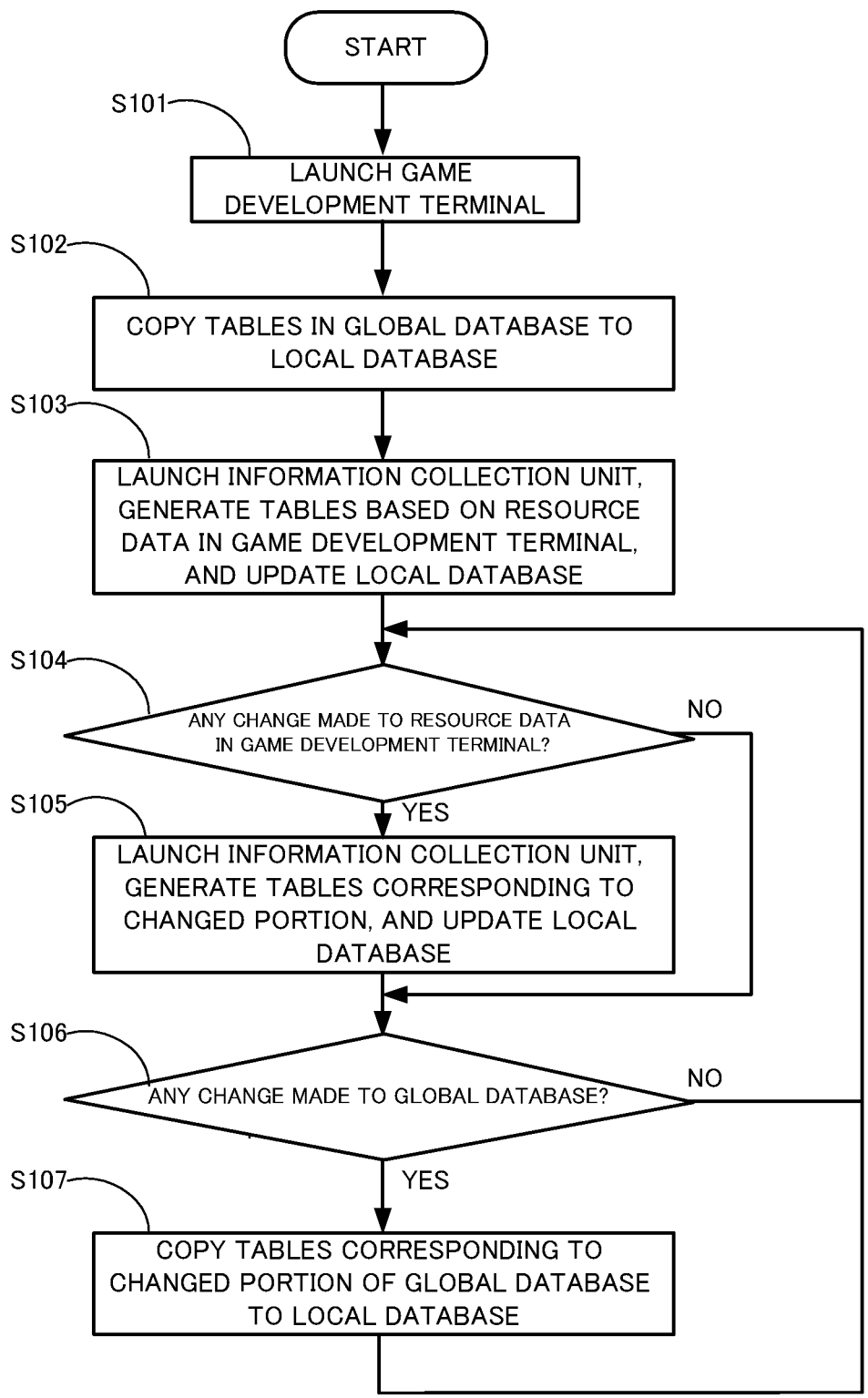
FIG. 13 is a flowchart illustrating updating of the local database.

Next, an example of updating the local database 62 will be described with reference to the flowchart in FIG. 13. As illustrated in FIG. 13, upon a game development terminal 3 being launched (step S101), the tables 5321 to 5325 in the global database 532 immediately before the game development terminal 3 is launched are copied to the local database 62 (step S102). That is, the initial values of the tables 621 to 625 in the local database 62 are the same as the values of the tables in the global database 532. Next, the information collection unit 44 is launched and generates the tables 621 to 625 based on all resource data 61 in the game development terminal 3, and stores the generated tables 621 to 625 in the local database 62. That is, the local database 62 is updated to reflect the resource data 61 in the game development terminal 3 (step S103). In other words, a table corresponding to the resource data 531 that does not exist in the game development terminal 3 but exists in the auxiliary server 5 is not updated.

Next, if a change has been made to the resource data 61 in the game development terminal 3 (YES in step S104), the aforementioned database updating unit 46 detects this change, and launches the information collection unit 44 to generate a table corresponding to the changed portion. Then, the database updating unit 46 updates the portion corresponding to the generated table in the local database 62 (step S105). Exemplary cases where a change is made to the resource data 61 include a case where a developer has edited the resource data 61. Since this editing processing is continuously performed during game development, the tables are also updated continuously.

Subsequently, if the global database 532 has been changed (YES in step S106), a table corresponding to the changed portion in the global database 532 is copied to the local database 62 (step S107). For example, the information collection unit 44 can perform this processing, but the present invention is not limited thereto. This processing can also be performed using any other application. Thereafter, the above-described processing is repeated. That is, the local database 62 is updated every time the resource data 61 in the game development terminal 3 is updated, and every time the global database 532 is updated. The global database 532 is changed in accordance with the updating of the resource data 144 in the main server 1. Meanwhile, the resource data 144 in the main server 1 is also updated continuously during game development. Accordingly, the global database 532 is also updated continuously.

8. Game Development Processing

Next, a game development method using the above-described main server 1, auxiliary server 5, and game development terminal 3 will be described. Initially, a game developer downloads, from the server 1, data related to game development such as the data management program 142, the game program 143, and the game data (resource data 144), and executes programs on the game development terminal 3. Unlike the game data and the like, the data management program 142 is not frequently updated during game development, and does not necessarily need to be downloaded every time. Accordingly, the data management program 142 may be downloaded only once and stored in the game development terminal 3, or may be stored in advance in the game development terminal 3. In the following description, a data management screen for developing a game will be described, and the summary of game development will then be described.

8-1. Data Management Screen

Figure 14:
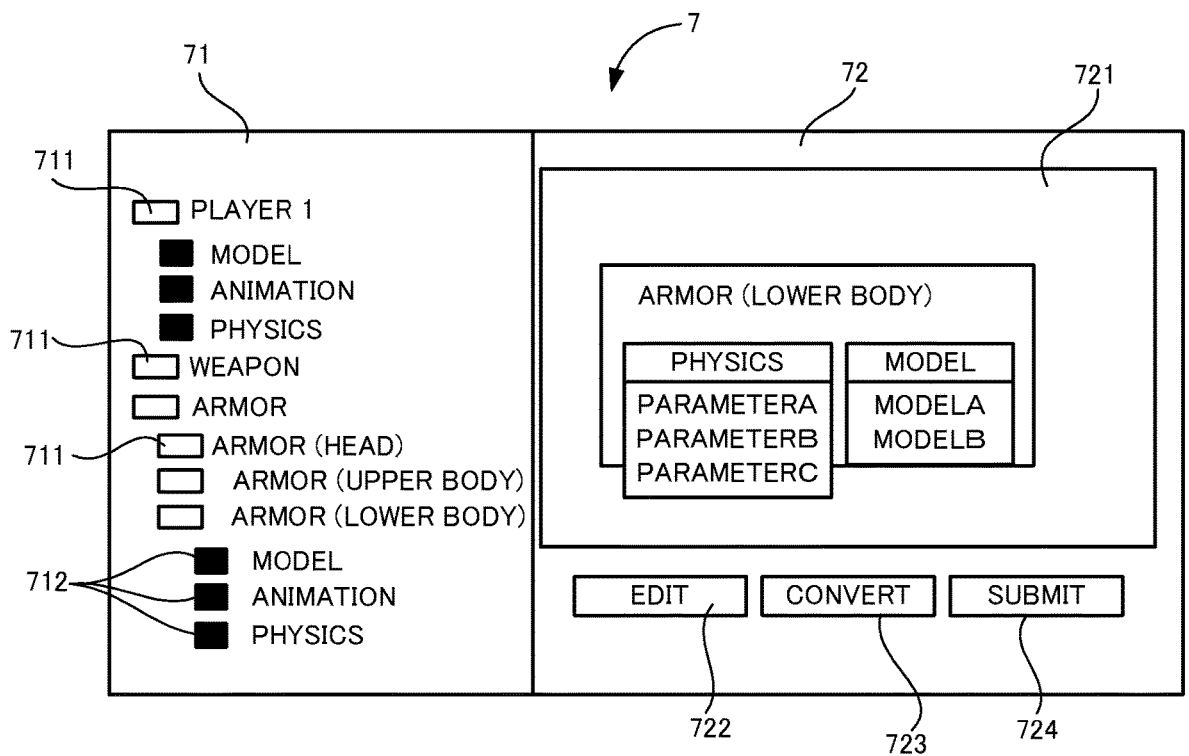
FIG. 14 shows a data management screen.

FIG. 14 shows a data management screen, which is displayed by executing the data management program 142. As described above, upon the data management program 142 being executed, a data management screen 7 is displayed on the display unit 313 in the game development terminal 3, and the game data can be edited by operating the data management screen 7. As illustrated in FIG. 14, two separate areas are displayed on the left and right side in the data management screen 7. That is, a first area 71 for displaying a game data list is displayed on the left side, and a second area 72 for editing the game data is displayed on the right side.

In the first area 71, a list of objects appearing in the game and game data pertaining thereto are displayed in a hierarchical structure. This list is created by the editing processing unit 41 in the controller 311 based on the resource data 61.

In the example illustrated in FIG. 14, a character "player 1", "weapon", and "armor" are displayed as classifications of objects higher in the hierarchical structure. "Head", "upper body", and "lower body" are displayed as classifications of armor lower in the hierarchical structure. The lowest classification corresponds to specific objects, and game data (resource data) is provided for these objects. For example, three instances of game data, namely "model", "animation", and "physics", are provided for the player 1.

In the example illustrated in FIG. 14, object classifications that are lower in the hierarchical structure or objects having game data have a rectangular white classification icon 711 displayed on the left side of the classification, the name of the object, or the like. Meanwhile, a rectangular black game data icon 712 is displayed on the left side of the name of the game data. Classifications, game data, and so on lower in the hierarchical structure than a classification for which the classification icon 711 is displayed can also be hidden. For example, classifications, game data, and so on lower in the hierarchical structure than the classification of "weapon" in FIG. 14 are not displayed, but the classifications, game data, and so on lower in the hierarchical structure can be displayed by pressing the classification icon 711.

The display method for the list indicated in the first area 71 can be changed as appropriate according to the type of the object. In other words, although FIG. 14 illustrates a hierarchical structure based primarily on characters, weapons, tools, and so on being displayed, for example, a hierarchical structure based on events can also be displayed. In other words, by pressing a display selection button (not illustrated), events can be displayed according to a hierarchical structure in a fragmented manner. Related characters can also be displayed in this hierarchical structure, and thus game data is displayed along with the objects in the same manner as illustrated in FIG. 14.

Figure 15:
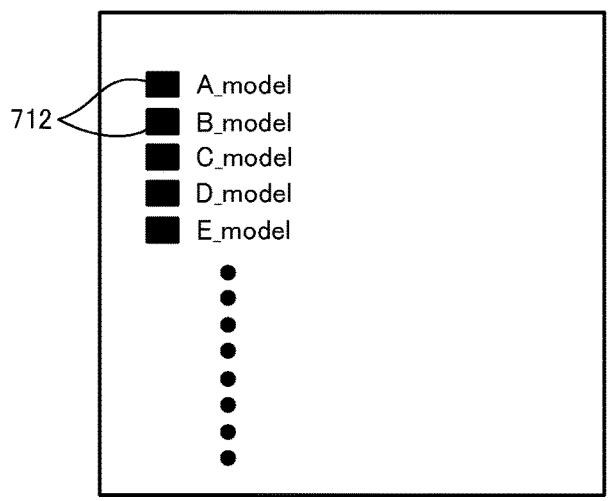
FIG. 15 shows a screen on which game data is extracted and displayed in a list form.

Various types of game data can also be extracted from this list. For example, as illustrated in FIG. 15, a list can be created by extracting only the game data pertaining to models, and that list can then be displayed in the first area 71. Lists can therefore be created not only on the basis of objects, but also on the basis of game data types. Note that such a list is not limited to being displayed in the first area 71. A window separate from the first area 71 can be displayed, and the lists can then be displayed in that window.

One or more game developers is assigned as an administrator for each instance of game data. Progress leading to the completion of the game data is also set.

The second area 72 will be described next. As illustrated in FIG. 14, the second area 72 displays tools for editing the game data. Specifically, an editing screen 721, an edit button 722, a convert button 723, and a submit button 724 are arranged here. A game data editing method will be described in detail later.

8-2. Game Data Editing

Figure 16:
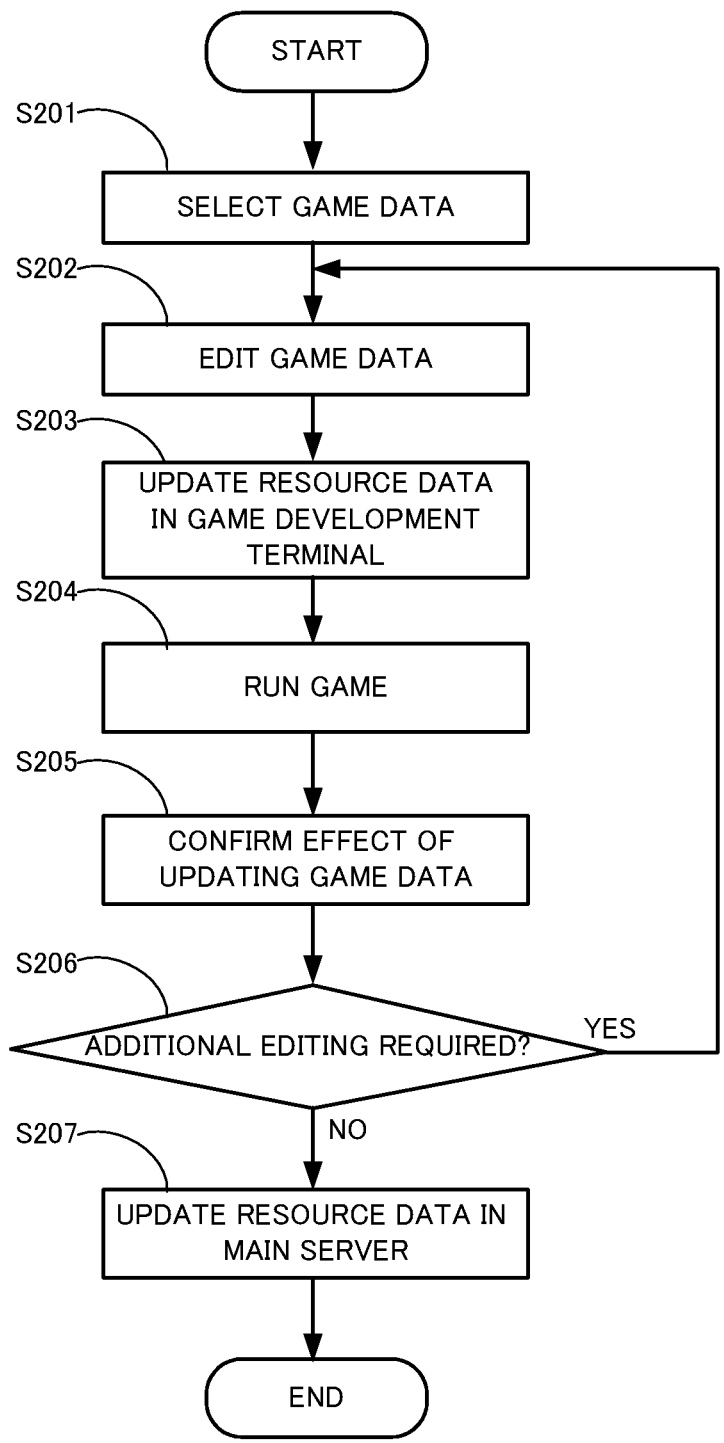
FIG. 16 is a flowchart illustrating game data editing processing.

Next, the editing of the game data will be described with reference to the flowchart in FIG. 16. First, the game data to be edited is selected from among the game data displayed in the first area 71 (step S201), and when the edit button 722 is then pressed, an editing screen 721 that corresponds to the selected game data is displayed in the second area 72.

For example, if "physics" game data for armor (lower body), which is an object displayed in the first area 71, is selected, parameters pertaining to that armor, such as weight, are displayed in the editing screen 721. The game developer can then carry out editing tasks such as modifying, adding, and deleting parameters displayed in the editing screen 721 (step S202). An editing screen based on the selected game data is displayed in the editing screen 721 in this manner. Accordingly, in the case where other game data has been selected, the editing screen 721 is displayed with different parameters and so on from those displayed for armor (lower body). The foregoing editing tasks are carried out by the editing processing unit 41 of the controller 311. In the above example, a tool that enables editing of game data pertaining to "physics" is launched, and editing processing is performed.

To edit the game data pertaining to "physics" of the object, the editing processing unit 41 in this example can directly read out the resource data pertaining to "physics" from the resource data, and edit the read data. For example, as illustrated in the editing screen in FIG. 14, parameters of "physics" are displayed in a pull-down menu upon clicking a "physics" button, enabling editing of these parameters. In contrast, in the case of checking the models used for an object to be edited, the resource data 61 cannot be directly read out from the editing processing unit 41. Otherwise it is very difficult to read out the resource data 61. Accordingly, in this case, the local database is used. For example, in the case where the object of armor (lower body) has been selected, upon the "model" button being clicked, the information provision processing unit 45 searches for the models used for this object in the local database 62 according to the procedure described above, and displays the list thereof in a pull-down menu. Thus, the developer can check the models used for armor (lower body). That is, in this example, it can be checked that a model A and a model B are used. Models displayed in the list can also be edited.

Depending on the type of game data, a dedicated application may be launched. For example, in the case where "animation" has been selected as the game data, a dedicated application for editing animations is launched. In this case, a dedicated application can be launched, and a dedicated window separate from the editing screen 721 can be displayed in order to carry out the editing. A 3D model creation/editing application, an image processing application, and so on can also be employed as this type of dedicated application.

When the editing of the game data using the editing screen 721 or a dedicated application is complete, the game developer presses the convert button 723 to confirm the completion of the editing. The game data downloaded to the game development terminal 3 is updated in response to this operation (step S203). Next, the game program is executed in response to an instruction from the game developer, in order to confirm the effects of the updated game data. A game into which the updated game data has been incorporated is then started (step S204). In other words, a game screen is displayed in the display unit of the game device 32 provided in the game development terminal 3. The game developer then causes the objects pertaining to the edited game data to be displayed in order to confirm the effects of the editing (step S205). In the case where confirming the effects of the editing indicates that additional editing is necessary (YES in step S206), the game data is edited again in the manner indicated in steps S202 to S205. Although these processes are executed on the basis of instruction operations made by the game developer, processes not required for editing tasks need not be instructed, and may not be executed. For example, in the case of a task where effects do not have to be confirmed, the processes of steps S204 and S205 may be omitted.

In the case where the effects of the editing have been confirmed and the editing is complete (NO in step S206), the game developer presses the submit button 724. In response to this operation, the edited game data is applied to the resource data 144 stored in the main server 1 (step S207). In other words, the resource data 144 stored in the main server 1 is updated. Accordingly, all of the game development terminals 3 connected to the main server 1 can browse the updated resource data 144 and the objects pertaining thereto, and editing thereof is thus enabled. With the updating of the resource data 144 in the main server 1, the global database 532 in the auxiliary server 5 is also updated. The above-described updating tasks are carried out by the game data updating unit 42 of the controller 311. Note that it is only necessary to hold data, of the data used by the game developer, that is to be used in the game as the resource data 144. Data necessary for the game developer to generate and edit game data but that is not used in the game, such as 3D model data having a higher level of detail than that used in the game, high-resolution texture data, or data that was not employed but that may be used during corrections need not necessarily be held in the main server 1, and may instead be held only in the game development terminal 3 used by the game developer.

Then, as described above, upon the resource data 61 being updated, tables corresponding to the updated resource data 61 are generated every time the resource data 61 is updated, or every predetermined time, by the information collection unit 44 as mentioned above, and the local database 62 is updated.

9. Effects 9-1

According to the embodiment, as a result of the local database 62 being constructed in each game development terminal 3, desired resource data 61 can be readily accessed even if the structure of the resource data 61 differs between games. Resource data 61 that cannot be directly handled due to the type or specifications of the editing processing units 41 can also be readily accessed by using the local database 62. This configuration enhances versatility in processing to edit the resource data, and also increases the editing processing speed.

9-2

The resource data in each game development terminal 3 differs from the resource data 144 in the main server 1 in some cases. That is, depending on the necessity or the like of the work, there are cases where a developer downloads only the necessary resource data 144, rather than all of the resource data 144, from the main server 1. Accordingly, only the downloaded resource data 61 is reflected in the generated local database 62. For example, there are cases where a developer who edits animations does not download resource data pertaining to models. In this case, no resource data pertaining to models exists in the game development terminal 3, and accordingly such resource data cannot be browsed or edited.

In contrast, as a result of constructing the global database 532 as described above, tables corresponding to all of the resource data 144 existing in the main server 1 are generated and copied to the local database 62. Accordingly, a game developer can access all types of resource data. In addition, the global database 532 is generated based on the latest resource data 144 in the main server 1. Based on this global database 532, the latest resource data is also reflected in the local database 62.

9-3

In the above-described game development terminal 3, the controller 311 need only execute the information collection unit 44, the information provision processing unit 45, and the database updating unit 46. Accordingly, an application that executes the functions denoted by 40 in FIG. 3 need only be installed, and an area for constituting the local database 62 in the storage unit 312 need only be secured, in a conventional game development terminal. That is, even with a terminal with the same hardware configuration as that of a conventional game development terminal, the foregoing effects can be achieved without changing the hardware configuration.

10. Variations

An embodiment of the present invention has been described thus far. However, the present invention is not intended to be limited to the above-described embodiment. Many variations can be made thereon without departing from the essential spirit of the present invention. The following variations are possible, for example. The following variations can also be combined as appropriate.

10-1

In the foregoing embodiment, data editing processing, construction of the local database 62, and the like are carried out by downloading the data management program 142 stored in the main server 1 and then executing that program on the game development terminal 3. However, the data management program 142 can also be stored in the storage unit 312, the ROM, or the like of the game development terminal 3. The same applies to the auxiliary server 5.

10-2

In the game development terminal 3, the resource data 61 and the local database 62 are stored in the storage unit 312. However, the resource data 61 and the local database 62 can be stored in different storage units. The same applies to the auxiliary server 5.

10-3

In the above-described system, the global database 532 is constructed by the auxiliary server 5. However, the global database 532 is not essential, and may not be provided either.

10-4

In the above-described embodiment, if the resource data is updated, only a corresponding portion of the local database 62 and the global database 532 is updated. However, the entire local database 62 and global database 532 may also be updated.

10-5

In the above-described embodiment, the source tables that organize the resource data on the basis of types, and the connection tables that indicate the association between the source tables are generated. However, tables are not limited to those tables. The local database 62 and the global database 532 need only include the first information that at least includes a location (URI, path etc.) of the resource data on the basis of types of resource data, and the second information indicating the association between different types of resource data in a corresponding relationship. Based on the above-described information, resource data associated with other resource data can be acquired and browsed, for example, even if the structure of the resource data differs between games to be developed.

10-6

When executing the game program 140 in the game development terminal 3, the program can be executed in the terminal main unit 31, and the game image can be displayed in the game device 32. In the foregoing embodiment, the game device 32 is included in the game development terminal 3. However, if the game can be executed without using a dedicated game device, such as by a smartphone or personal computer, the display unit that displays the game image can be the display unit 313 provided in the terminal main unit 31 as described above, or the game image can be displayed in a display unit provided separate from the terminal main unit 31.

10-7

The configuration of the screen 57 described in the foregoing embodiment is merely an example, and the layouts of the screens, the display items, the buttons, and so on can be changed as appropriate.

10-8

The above-described embodiment is an example in the case of applying the content development system according to the present invention to a game development system, but the content development system according to the present invention is also applicable to other systems. That is, the content development system according to the present invention is applicable not only to game development, but also to a system and apparatus for creating a video content, for example.

LIST OF REFERENCE NUMERALS

1 Main server (first server)
3 Game development terminal (content development device)
312 Storage unit (resource data storage unit, database storage unit)
41 Editing processing unit
44 Information collection unit

What is claimed is:

1. A content development system comprising:
a first server;
a second server; and
a plurality of content development apparatuses,
wherein the plurality of content development apparatuses comprise:
at least one first memory;
at least one first processor;
wherein the at least one first memory comprises:
a first resource data storage storing a plurality of first resource data pertaining to content being created;
a first database storage storing a first database pertaining to the first resource data;
wherein the at least one first processor is configured to:
download a plurality of resource data from the first server and store the downloaded resource data in the first resource data storage, wherein the downloaded resource data is at least a subset of resource data stored in the first server;
execute a plurality of editing processes each being capable of editing a corresponding type of the first resource data;
generate, based on the plurality of the first resource data, first information created for each type of the first resource data and at least including a location of each of the first resource data, and second information expressing an association between different types of the first information, and stores the first information and the second information in the first database in the first database storage;
respond to a request from one of the editing processes to acquire, using a designated first resource data which has been designated by a user from the plurality of first resource data, information indicating a different type of the first resource data associated with the designated first resource data, based on at least one of the first information and the second information expressing the association included in the first database, and notify the editing process that made the request, of the acquired information; and
update at least one of the first information or the second information in the first database if at least a portion of the first resource data stored in the first resource data storage has been updated,
wherein when the editing by one of the plurality of editing processes is confirmed and complete, the edited first resource data is applied to the resource data stored in the first server and the resource data stored in the first server is updated, and
the second server comprises:
at least one second processor;
at least one second memory comprising:
a second resource data storage that stores a plurality of second resource data downloaded from the first server;
a second database storage that stores a second database pertaining to the plurality of second resource data;
wherein the at least one second processor is configured to:
generate, based on the plurality of the second resource data stored in the second resource data storage, first information created for each type of the second resource data and at least including a location of each of the second resource data, and second information expressing an association between different types of the first information, and stores the first information and the second information in the second database in the second database storage; and
transmit the first information and the second information contained in the second database to each of the plurality of content development apparatuses, wherein each of the plurality of content development apparatuses updates at least one of the first information or the second information in the first database.

2. The content development system according to claim 1, wherein the at least one second processor generates, in the second database, a plurality of first tables, each of the first tables at least including the location of each of the second resource data, the first tables serving as the first information in the second database, and at least one second table expressing the association between information included in one of the first tables and information included in another one of the first tables, the at least one second table serving as the second information in the second database.

3. The content development system according to claim 1, wherein if the first information or the second information in the second database has been changed, the at least one first processor copies the second database corresponding to the changed portion of the first information or the second information in the second database to the first database.

4. The content development system according to claim 1, wherein the at least one first processor only updates information regarding an updated first resource data.

5. The content development system according to claim 1, wherein the first information and the second information contained in the second database is used as initial values for the first information and the second information in the first database for each of the content development apparatuses.

6. The content development system according to claim 1, wherein when the editing by one of the plurality of editing processes is confirmed and complete, the at least one first processor transmits the edited first resource data to the first server, the first server copies the edited first resource data in the resource data stored in the first server.

7. The content development system according to claim 1, wherein the at least one second processor updates at least one of the first information or the second information in the second database stored in the at least one second memory when the resource data stored in the first server is updated.

8. The content development system according to claim 7, wherein when the first server or the at least one second processor detects that the resource data stored in the first server is updated, the first server transmits the updated resource data stored in the first server to the second server, the at least one second processor copies the updated resource data to the second resource data storage stored in the at least one second memory.

9. The content development system according to claim 7, wherein if the first information or the second information in the second database has been changed, the at least one first processor copies the second database corresponding to the changed portion of the first information or the second information in the second database to the first database.

10. The content development system according to claim 9, wherein if the first information or the second information in the second database has been changed, the at least one second processor transmits the changed portion of the first information or the second information in the second database to the plurality of content development apparatuses, the at least one first processor copies the second database corresponding to the changed portion in the second database to the first database.

\* \* \* \* \*